United States Patent [19]
Sawyer et al.

[11] Patent Number: 5,953,664
[45] Date of Patent: Sep. 14, 1999

[54] EXPEDITED VISITED GATEWAY ACCESS METHODS AND SYSTEMS

[75] Inventors: Steven Paul Sawyer, Fountain Hills; Peter Joseph Armbruster, Chandler, both of Ariz.

[73] Assignee: Motorola, Inc., Schaumburg, Ill.

[21] Appl. No.: 08/775,231

[22] Filed: Dec. 30, 1996

[51] Int. Cl.$^6$ .................................................. H04Q 7/20
[52] U.S. Cl. ..................... 455/433; 455/12.1; 455/427; 455/432
[58] Field of Search .................... 455/12.1, 403, 455/406, 422, 427, 428, 429, 430, 432, 433, 435

[56] References Cited

U.S. PATENT DOCUMENTS

| | | | |
|---|---|---|---|
| 4,876,738 | 10/1989 | Selby | 455/435 |
| 5,590,175 | 12/1996 | Gallant et al. | 455/433 |
| 5,655,005 | 8/1997 | Wiedeman et al. | 455/430 |
| 5,722,067 | 2/1998 | Fougnies et al. | 455/406 |

*Primary Examiner*—Dwayne D. Bost
*Assistant Examiner*—Nay A. Maung
*Attorney, Agent, or Firm*—Harold C. McGurk; Frank J. Bogacz

[57] ABSTRACT

Methods (100, 150, 200) and systems (10, 30, 41) are used to expedite access for a period of time for those subscriber units (30) which have previously executed the complete visited gateway access procedures. By checking certain information sent by a subscriber unit (30) upon initialization and determining whether the information falls within a predetermined period of time, the visited gateway (41) enables itself to receive calls directly from the subscriber unit (30) and informs the subscriber unit (30) that it (30) can send calls directly to the visited gateway (41). The subscriber unit (30) thereafter sends calls to the visited gateway (41) instead of to the home gateway (40) until it (30) is no longer allowed to do so.

7 Claims, 2 Drawing Sheets

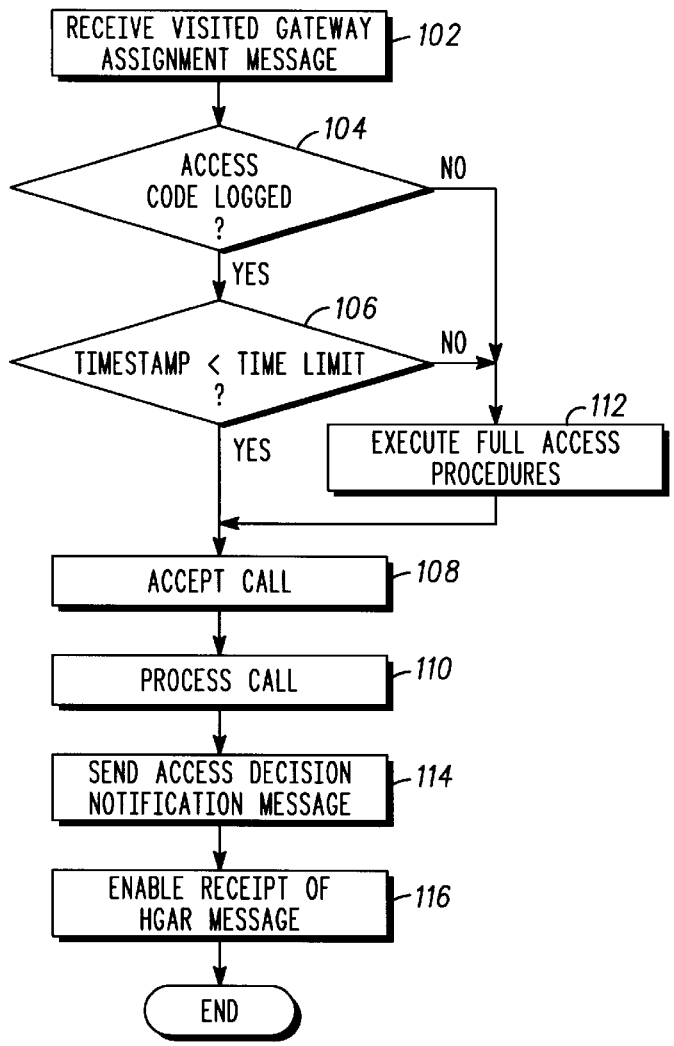
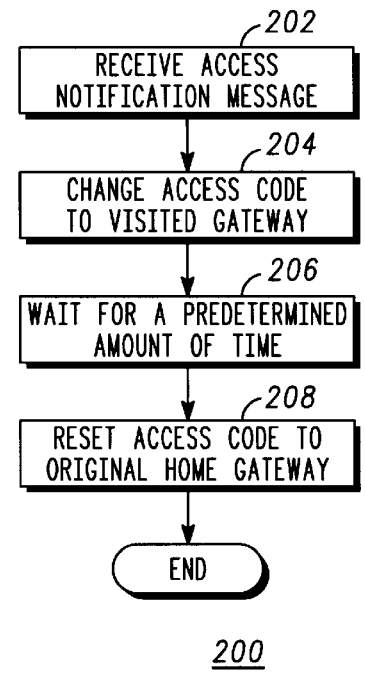
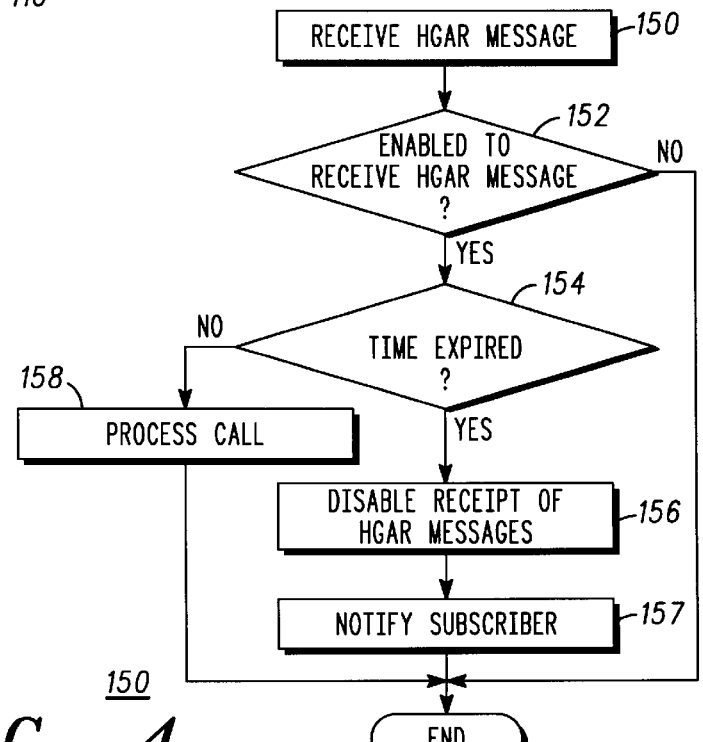

EXPEDITED VISITED GATEWAY ACCESS METHODS AND SYSTEMS

TECHNICAL FIELD

This invention relates generally to space-based communication systems and, in particular, to systems and methods that expedites subscriber unit procedures for accessing the communication system.

BACKGROUND OF THE INVENTION

When a subscriber unit requests service in conventional space-based or terrestrial communication systems, the system responds by executing a visited gateway access procedure. Once a visited gateway is selected by the home gateway, the access request is forwarded to the visited gateway. The visited gateway may accept or deny access based on the location or other information about the requesting mobile. This step preserves the political sovereignty of the country in which the visited gateway is located and allows the operator of the visited gateway to accept or deny access based on it preferred criteria.

A home gateway selects a visited gateway by executing a home gateway access procedure. This procedure performs one or more geolocation measurements to determine the location of the mobile subscriber unit for the purpose of deciding whether it should be allowed access into the network (i.e., certain users may be blocked from accessing the network from certain areas). When a subscriber is provisioned for service, a service provider ID (SPID) is placed in the subscriber's subscriber unit to identify the country of origin of the subscriber. The home gateway access procedure performs calculations to locate a subscriber and checks the calculated location against a list of approved service providers. This feature permits system providers to enforce political sovereignty (e.g., country A may have a political disagreement with country B, and the home gateway access procedure allows country A to deny system access when any country B subscribers roam into country A). The location calculation is then used to compute which visited gateway should control the call. This selection is usually based on which gateway is closest to the subscriber, but other criteria may be used as well. If the home gateway allows the subscriber access, the location information is passed to the selected visited gateway, where an autonomous access decision is performed.

The visited gateway access procedure may experience considerable delay before the call is set up. Thus, there is a significant need for a system and methods that bypass the visited gateway access procedure to reduce call set up delay.

BRIEF DESCRIPTION OF THE DRAWINGS

FIG. 3 shows a flowchart of a method for bypassing the visited gateway access procedure according to a preferred embodiment of the present invention;

FIG. 4 shows a flowchart of a method where a visited gateway receives messages directly from a subscriber unit according to a preferred embodiment of the present invention; and FIG. 5 shows a flowchart of a method performed by the subscriber unit to access directly a visited gateway according to a preferred embodiment of the present invention.

DESCRIPTION OF THE PREFERRED EMBODIMENTS

The present invention has utility in that a visited gateway access procedure is not executed every time a subscriber unit requests service. The present invention allows a subscriber unit to bypass an entire visited gateway access procedure by remembering whether the subscriber unit recently executed visited gateway access procedure. The present invention also provides expedited handling so that a subscriber unit can directly access a visited gateway if it had recently executed the visited gateway access procedure.

Both the home gateway and visited gateway have the capability of disallowing service to the requesting subscriber based on the subscriber's location information and the service provider ID (SPID). Whereas the home gateway access table is generated by a system control center, the visited gateway table can be administered locally, thereby relieving the visiting gateway operator of dependence on the system control center for subscriber access permission.

A "satellite" as used throughout this description means a man-made object or vehicle intended to orbit the earth. A "satellite" comprises geostationary satellites, or satellites orbiting the earth at low-earth or medium-earth altitudes and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based communication systems and/or combinations thereof.

Figure 1:
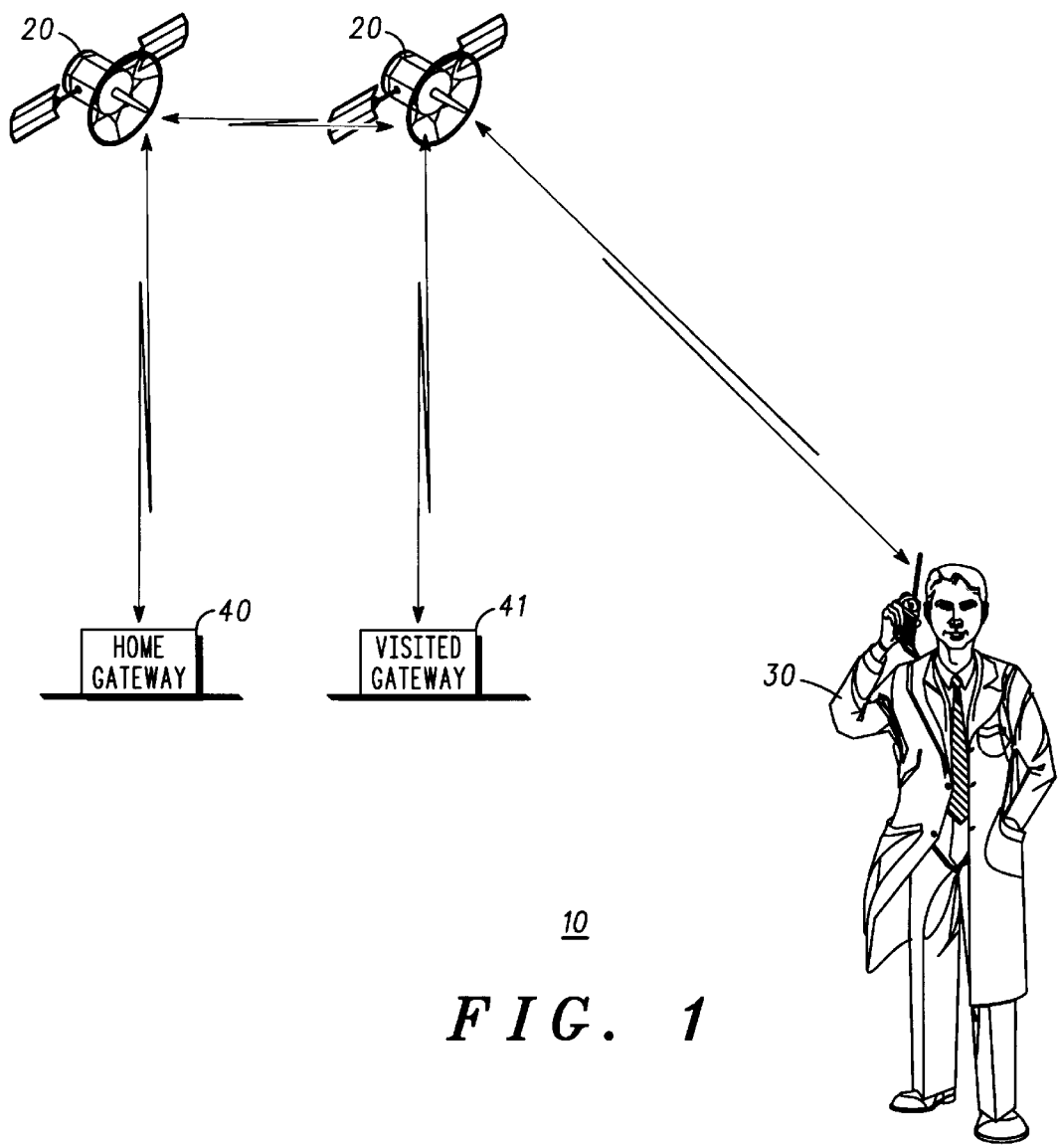
FIG. 1 shows a general view of a space-based communication system according to a preferred embodiment of the present invention.

FIG. 1 shows a general view of space-based communication system 10 according to a preferred embodiment of the present invention. Although FIG. 1 illustrates a highly simplified diagram of communication system 10, system 10 comprises at least one satellite 20, any number of subscriber units 30 and home gateway 40 and at least one visited gateway 41. Generally, communication system 10 may be viewed as a network of nodes. All nodes of communication system 10 are or may be in data communication with other nodes of communication system 10 through communication links. In addition, all nodes of communication system 10 are or may be in data communication with other telephonic devices dispersed throughout the world through public switched telephone networks (PSTNs) and/or conventional terrestrial communication devices coupled to a PSTN through conventional terrestrial base stations.

The present invention is applicable to space-based communication systems that assign particular regions on the earth to specific cells on the earth, and preferably to systems that move cells across the surface of the earth. Although the present invention is applicable to space-based communication systems 10 having at least one satellite 20 in low-earth, medium-earth or geosynchronous orbit, satellite 20 is preferably in low-earth orbit around earth. Satellite 20 may be a single satellite or one of many satellites in a constellation of satellites orbiting earth. The present invention is also applicable to space-based communication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on the earth's surface).

Each satellite 20 communicates with other adjacent satellites 20 through cross-links. These cross-links form a backbone of space-based mobile communication system 10. Thus, a call or communication from one subscriber unit located at any point on or near the surface of the earth may be routed through a satellite or a constellation of satellites to within range of substantially any other point on the surface of the earth. A communication may be routed down to a subscriber unit (which is receiving the call) on or near the surface of the earth from another satellite 20. How satellite 20 physically communicates with subscriber units 30 and gateways 40, 41 is well known to those of ordinary skill in the art.

Subscriber units 30 may be located anywhere on the surface of earth or in the atmosphere above earth. Communication system 10 may accommodate any number of subscriber units 30. Subscriber units 30 are preferably communication devices capable of receiving voice and/or data from satellites 20 and/or gateway 40. By way of example, subscriber units 30 may be hand-held, mobile satellite cellular telephones adapted to transmit to and receive transmissions from satellites 20 and/or gateways 40, 41. Moreover, subscriber units 30 may be computers capable of sending email messages, video transmitters or facsimile machines just to name a few.

How subscriber units 30 physically transmit voice and/or data to and receive voice and/or data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Home gateway 40 communicates with and may control satellite 20. There may be multiple visited gateways 41 located at different regions on the earth. For example, there may be one gateway 41 located in Honolulu, another located in Los Angeles and another in Washington, D.C. Another example is to have separate gateways 41 located in each country on the earth. Gateways 40 may provide satellite control commands to satellite 20 so that satellite 20 maintains its proper position in its orbit and performs other essential house-keeping tasks. Gateways 40, 41 may be additionally responsible for receiving voice and/or data from satellite 20. How gateways 40, 41 physically communicate with satellites 20 and/or subscriber units 30 is well known to those of ordinary skill in the art.

A "gateway" 40 as referred to throughout this description includes home gateways, visited gateways, alternate home gateways, alternate visited gateway, ground stations, ground control stations, base stations, earth terminals or any other term representing a facility that determines which satellite or base station should service a particular subscriber unit. A "home gateway" is the subscriber unit's main gateway where its information is stored. In the preferred embodiment, a home gateway is where the subscriber (e.g., user) was assigned at sign-up to use the space-based system. In alternative embodiments, a home gateway is according to where the subscriber user lives (or has his/her home). A "visited gateway" is not a home gateway for particular subscriber unit, but a gateway that has subscriber units assigned to it according to particular criteria.

Figure 2:
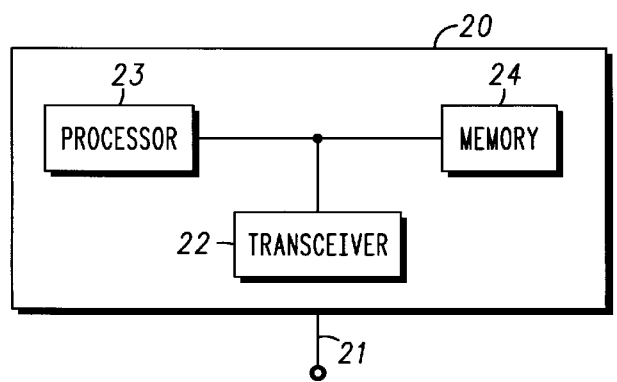
FIG. 2 shows a general view of the components of a satellite, a home gateway and a visited gateway according to preferred embodiment of the present invention.

FIG. 2 shows a general view of the components of satellite 20 and/or gateways 40, 41 according to a preferred embodiment of the present invention. For purposes of this description, reference will be made to satellite 20, although most of the components are similar to those in gateway 40. Satellite 20 comprises at least the following components: antenna 21, transceiver 22, processor 23 and memory 24. There may be other components of satellite 20 that are not shown which are necessary for operating a satellite but are not important to the present invention. These other components are well known to those of ordinary skill in the art, including for example, solar arrays and fuel propulsion system in satellites 20, or switches and network routers in gateways 40. Moreover, there may be more than one of the components in satellite 20, such as multiple processors 23, for example.

Antenna 21 of satellite 20 is coupled to transceiver 22, while transceiver 22, processor 23 and memory 24 are inter-coupled to each other. Transceiver 22 is able to transmit or receive data or voice, and may be for example, a modem. Transceiver 22 is also capable of receiving data from subscriber units 30 and/or gateway 40. Processor 23, via a software program controls the operation of satellite 20 and the other components of satellite 20. Memory 24 stores part of the software executable version of method 100 (described below) and other software programs. Antenna 21, transceiver 22, processor 23 and memory 24 are all well known to those of ordinary skill in the art.

FIG. 3 shows a flowchart of method 100 for bypassing a visited gateway access procedure according to a preferred embodiment of the present invention. Method 100 is executed by different parts of the communication system 10, including but not limited to subscriber unit 30, servicing satellite(s) 20, home gateway 40 and visited gateway 41, all which are shown in FIG. 1.

According to FIG. 3, method 100 begins in step 102 when a visited gateway receives a visited gateway assignment message. The visited gateway assignment message can have any format and includes a subscriber identification code and an access code. The subscriber identifier code is a unique number assigned to each subscriber unit in the system and is one of the new features of the present invention. The access code defines the location of the home gateway and is used by the constellation of satellites to route an access request made by a subscriber unit to the subscriber's home gateway. The access code may also identify a subscriber class of the subscriber.

Once the visited gateway assignment is received, the visited gateway checks in step 104 to determine if it has a record (or log) of the access code which is contained in the message. If there is such a record or log, this means that this subscriber unit has previously gone through the full visited gateway access procedure at this visited gateway.

If the message contains a log of the access code, the visited gateway determines in step 106 whether a time stamp associated with the record is less than a predetermined time limit. The time stamp is given by the visited gateway each time the full access procedure is executed. This allows the visited gateway to remember the time of the last full access procedure and bypass it for a predetermined time limit for this subscriber. The time-stamp also allows the home gateway to skip lengthy location determination calculations if it is assumed that the subscriber could not have moved a great distance within the specified time period, and therefore an additional location calculation is not needed. Relieving the home gateway from this calculation allows those home gateway resources to be used for other tasks, such as handling a greater number of revenue-bearing traffic channels. The subscriber also notices a decrease in the time required to set up the call.

The predetermined time limit is set to a duration for which it is reasonable to assume the normal access procedure would yield the same result. In the preferred embodiment, the predetermined time limit is set to one hour. Different predetermined time limits could be assigned for different types of subscriber units (e.g., regular, low-medium speed subscriber units vs. high-speed aeronautical subscriber unit). The type of subscriber unit could be included in the visited gateway assignment message as part of its identification.

If the elapsed time since the time stamp has not exceeded the predetermined time limit, the visited gateway obtains a record of the visited gateway selected during the initial access and immediately accepts in step 108 the call request (from the subscriber unit) and starts to process the call in step 110. Processing the call may include sending a message to the satellite servicing the subscriber unit for the satellite to begin setting up the call (i.e., assigning signaling and voice/data paths for the call).

If the visited gateway does not find a log of the access code in step 104 or determines in step 106 that the time since the initial access has been too long, the visited gateway initiates in step 112 the full access procedure. The full procedure creates a new record or updates an old record to save the access code, the subscriber identifier code, identification of the home gateway and the time stamp of this access. After the visited gateway creates or updates the necessary records, the visited gateway goes to step 108 and accepts the call, followed by setting up the call in step 110.

After step 110, the visited gateway sends to the subscriber unit an access decision notification message. This message informs the subscriber unit that instead of going through the home gateway to set up a call, the subscriber unit can, for a predetermined period of time, send a home gateway access request (HGAR) message directly to the visited gateway. This method saves considerable call set up time because the call does not have to go through the home gateway.

After notifying the subscriber unit in step 114, the visited gateway enables itself to receive HGAR messages directly from the subscriber unit for a predetermined amount of time. This can be accomplished by the visited gateway indicating in its record of the access code that the subscriber unit has been given permission to send future home gateway access messages directly to the visited gateway for a specified amount of time. After step 114, method 100 ends.

FIG. 4 shows a flowchart of a method where a visited gateway receives home gateway access request (HGAR) messages directly from a subscriber unit according to a preferred embodiment of the present invention. Method 150 is executed by the visited gateway (41, FIG. 1). Once a visited gateway receives a HGAR message in step 150, it determines in step 152 whether it is enabled to receive any HGAR messages. If the visited gateway is not enabled to receive HGAR messages, method 150 ends. Otherwise, the visited gateway is enabled (from step 116, FIG. 3) to receive HGAR messages.

The visited gateway next checks in step 154 whether a period of time (e.g., clock count-down) in which the visited gateway can receive this particular HGAR message has expired. If the time has expired, the visited gateway disables itself in step 156 so that HGAR messages can not be received by the visited gateway until it is re-enabled. The visited gateway also notifies in step 157 the subscriber unit to go back to using its real home gateway. In alternative embodiments, the visited gateway may forward the HGAR message to the real home gateway (using home gateway information encoded in the stored access code) or may ignore the request.

If there is a record of the subscriber unit at the visited gateway in step 152 and the time stamp has not expired in step 154, the subscriber unit has permission to access the system. Accordingly, the visited gateway accepts and processes the call in step 158, and thereafter, method 150 ends. Otherwise, the subscriber unit does not have permission, and method 150 ends.

FIG. 5 shows a flowchart of a method performed by the subscriber unit to access directly a visited gateway according to a preferred embodiment of the present invention. In step 202, the subscriber unit receives an access decision notification message. This message informs the subscriber unit that it can send home gateway access request (HGAR) messages directly to the designated visited gateway. The subscriber unit alters in step 204 a value of the access code, which encodes the identity of the gateway to which the satellites route the HGAR message. Instead of having a value that identifies the home gateway, the value is set to be the visited gateway. Thereafter, the subscriber unit waits for a predetermined amount of time in step 206 before resetting the access code so that the home gateway will receive the HGAR message instead of the visited gateway. After step 208, method 200 ends.

It will be appreciated by those skilled in the art that the present invention includes a system and methods that allows expedited access for a period of time for those subscriber units which have previously executed the complete access procedures. Another advantage of the present invention is that the average network call set up delay is reduced. Yet another advantage of the present invention is to allow the subscriber unit to bypass the entire visited gateway access procedure by allowing the home gateway to remember the subscriber unit and provide expedited handling to it. Another advantage is to reduce average network call setup times for subscriber units involved in multiple calls from the same area during a predetermined period of time. Another advantage is the network resources needed to perform the full access process are reduced.

Accordingly, it is intended by the appended claims to cover all modifications of the invention which fall within the true spirit and scope of the invention.

What is claimed is:

1. A method for expediting call set up of a call made by a subscriber unit, the method comprising the steps of:

a) sending by the subscriber unit a message including an access code to a visited gateway, if the visited gateway is enabled and if a time period has not expired for sending a home gateway access request (HGAR) message;

b) receiving a first message informing the subscriber unit to send the HGAR messages directly to the visited gateway;

c) sending by the subscriber unit HGAR messages to the visited gateway instead of a home gateway to expedite call set up by the visiting gateway and;

d) disabling the visited gateway from receiving HGAR messages and receiving by the subscriber unit a second message, if the time period has expired.

2. A method as recited in claim 1, wherein the step of sending by the subscriber unit a message includes the step of sending a subscriber identification code which identifies a subscriber unit that is making a request for the call set up.

3. A method as recited in claim 1, further comprising the step of notifying the subscriber unit executing a full access procedure, if there is no record of the access code or the time stamp is greater than the time period.

4. A method as recited in claim 1, further comprising the step of sending HGAR messages to the home gateway instead of the visited gateway if the time period has expired.

5. A method for expediting call set up, the method comprising the steps of:

a) a visited gateway receiving a first message which includes an access code;

b) the visited gateway expediting call set up if there is a record of the access code and if a time stamp associated with the access code is less than a time period;

c) the visited gateway sending a second message to a subscriber unit that informs the subscriber unit to send home gateway access request (HGAR) messages directly to the visited gateway;

d) the subscriber unit receiving the second message;

e) the subscriber unit sending HGAR messages to the visited gateway instead of a home gateway;

f) the visited gateway receiving HGAR messages;

g) the visited gateway expediting call set up if the visited gateway is enabled and if a time period has not expired for receiving a HGAR message from the subscriber unit; and h) disabling the visited gateway from receiving HGAR messages and notifying the subscriber unit if the time period has expired.

6. A method as recited in claim 5, wherein step (g) further comprising the step of not executing call set up if the visited gateway is not enabled.

7. A method as recited in claim 5, further comprising the step of sending HGAR messages to the home gateway instead of the visited gateway if the time period has expired.

* * * * *